(12) United States Patent
Aldawood et al.

(10) Patent No.: US 11,880,007 B2
(45) Date of Patent: Jan. 23, 2024

(54) DAS SYSTEM FOR PRE-DRILL HAZARD ASSESSMENT AND SEISMIC RECORDING WHILE DRILLING

(71) Applicant: Saudi Arabian Oil Company, Dhahran (SA)

(72) Inventors: Ali Aldawood, Safwa (SA); Andrey Bakulin, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 545 days.

(21) Appl. No.: 17/115,471

(22) Filed: Dec. 8, 2020

(65) Prior Publication Data

US 2022/0179113 A1 Jun. 9, 2022

(51) Int. Cl.
*G01H 9/00* (2006.01)
*G01V 1/22* (2006.01)
*G01V 1/52* (2006.01)

(52) U.S. Cl.
CPC ............ *G01V 1/226* (2013.01); *G01H 9/004* (2013.01); *G01V 1/52* (2013.01)

(58) Field of Classification Search
CPC .......... G01V 1/226; G01V 1/52; G01H 9/004
See application file for complete search history.

(56) References Cited

U.S. PATENT DOCUMENTS

| 10,444,388 | B2 | 10/2019 | Dusterhoft et al. | |
| 2012/0092960 | A1* | 4/2012 | Gaston | G01V 1/226 367/35 |
| 2015/0233236 | A1* | 8/2015 | Johnston | G01V 1/226 73/152.16 |
| 2017/0075000 | A1 | 3/2017 | Dusterhoft et al. | |
| 2020/0116883 | A1* | 4/2020 | Padhi | G01V 1/305 |
| 2020/0271811 | A1 | 8/2020 | Wilson et al. | |

FOREIGN PATENT DOCUMENTS

WO    WO-2011163286 A1 * 12/2011 ............. G01V 1/16

OTHER PUBLICATIONS

Extended European Search Report in corresponding EP Appliction No. 21210005.1, dated Apr. 22, 2022; 8 pages.
(Continued)

*Primary Examiner* — Krystine E Breier
(74) *Attorney, Agent, or Firm* — Leason Ellis LLP (57) ABSTRACT

A system and method of obtaining a high SNR seismic while-drilling data and a robust velocity profile of a geological site having a main well and at least one uphole located in the vicinity of the main well, the seismic profile being obtained from seismic waves generated by a drilling device located at the main well. The method comprises deploying at least one distributed acoustic fiber optic cable vertically in the at least one uphole, at least a portion of the fiber optic cable being positioned at a depth exceeding a predetermined depth below the surface, receiving seismic data at recording station positioned on the at least one fiber optic cable at at least the predetermined depth, generating, at a processor a high SNR seismic while-drilling signal; yielding a reliable velocity profile from the seismic data received, and determining a presence of near surface hazards from the generated high SNR while drilling seismic data.

12 Claims, 8 Drawing Sheets

(56) References Cited

OTHER PUBLICATIONS

Alshuhail, Abdulrahman, et al. "Application of super-virtual seismic refraction interferometry to enhance first arrivals: A case study from Saudi Arabia." The Leading Edge 31.1 (2012): 34-39.

Al-Muhaidib, Abdulaziz M., et al. "DrillCam: A fully integrated real-time system to image and predict ahead and around the bit." SEG Technical Program Expanded Abstracts 2018. Society of Exploration Geophysicists, 2018. 719-723.

Bakulin, Andrey, et al. "Smart DAS upholes for simultaneous land near-surface characterization and subsurface imaging." The Leading Edge 36.12 (2017): 1001-1008.

Sawazaki, Kaoru, et al. "Time-lapse changes of P-and S-wave velocities and shear wave splitting int he first year after the 2011 Tohoku earthquake, Japan: shallow subsurface." Geophysical Journal International 193.1 (2013): 238-251.

Nakata, Nori, et al. "Monitoring a building using deconvolution interferometry, I: Earthquake-data analysis." Bulletin of the Seismological Society of America 103.3 (2013): 1662-1678.

* cited by examiner

DAS SYSTEM FOR PRE-DRILL HAZARD ASSESSMENT AND SEISMIC RECORDING WHILE DRILLING

FIELD OF THE DISCLOSURE

The present disclosure concerns geophysical surveying, and more particularly concerns a system and method for using distributed acoustic sensing to obtain a reliable velocity profile of a geological site and for detecting any drilling hazards in the near-surface by continuously recording high signal-to-noise ratio (SNR) seismic data while a drill bit penetrates through subsurface formations.

BACKGROUND OF THE DISCLOSURE

In oil and gas exploration, before a well bore is drilled deeply, it is important to determine whether near-surface hazards such as karsts, faults, or cavities are present in order to increase drilling safety. One technique that is often used to determine such hazards is shallow Vertical Seismic Profiling (VSP). A VSP survey records full waveform P- and S-wave signals yielding seismic images originating from surface-based sources and reveals valuable information about the structure and lithology of the subsurface.

A related technique, referred to as Seismic While Drilling (SWD) has been used to retrieve information about the earth subsurface by using the active drill-bit as a seismic source. It has been used for decades to predict hazards ahead of the drill bit and to provide some information about well conditions. However, drill bit-seismic has not provided the desired seismic images, as provided by VSP, due to the limited number of surface receivers that are typically utilized, as well as the quite low signal-to-noise ratio (SNR) of the collected passive data. A key objective of recording drill-bit noise is to reconstruct the subsurface structure of the earth as the drill-bit traverses through different subsurface formations. Conventional onshore SWD systems include the drill-bit as a seismic source, surface geophones to record the received seismic wavefields, and a top-drive sensor to record the drill-bit signature. Conventional SWD systems, suffer from a major drawback in that, when recording the signal in the vicinity of the rig-site, powerful seismic noise is generated by various components of the drilling operations (e.g., mud-pump, rotary drive, shale-shaker, etc.). Ideally, the desired signal retrieved from the subsurface is obtained by correlating the recorded wavefields at the recording stations with the drill-bit noise pilot recorded by the top drive sensor. However, the noise generated by the surface conditions often obscures the desired signal, especially near the wellhead.

Figure 1:
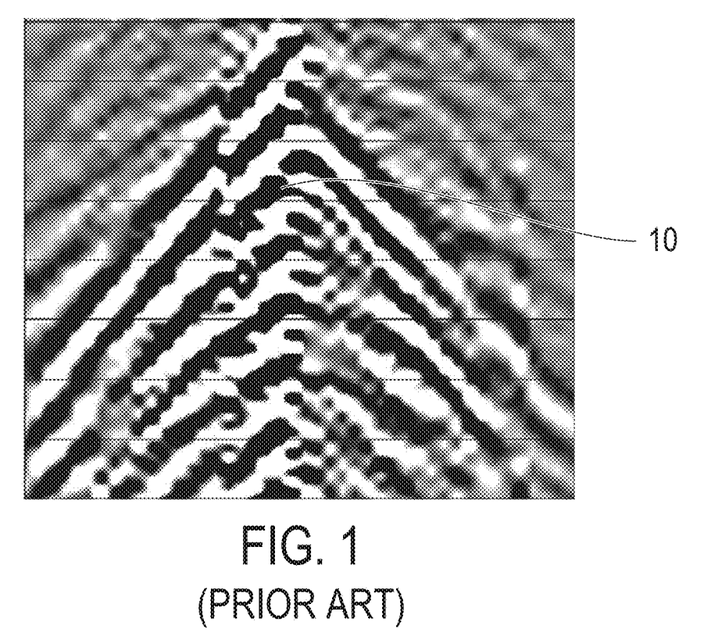
FIG. 1 is an exemplary seismic correlated drill-bit gather plot typically received using a seismic-while drilling system according to the prior art.
Figure 2:
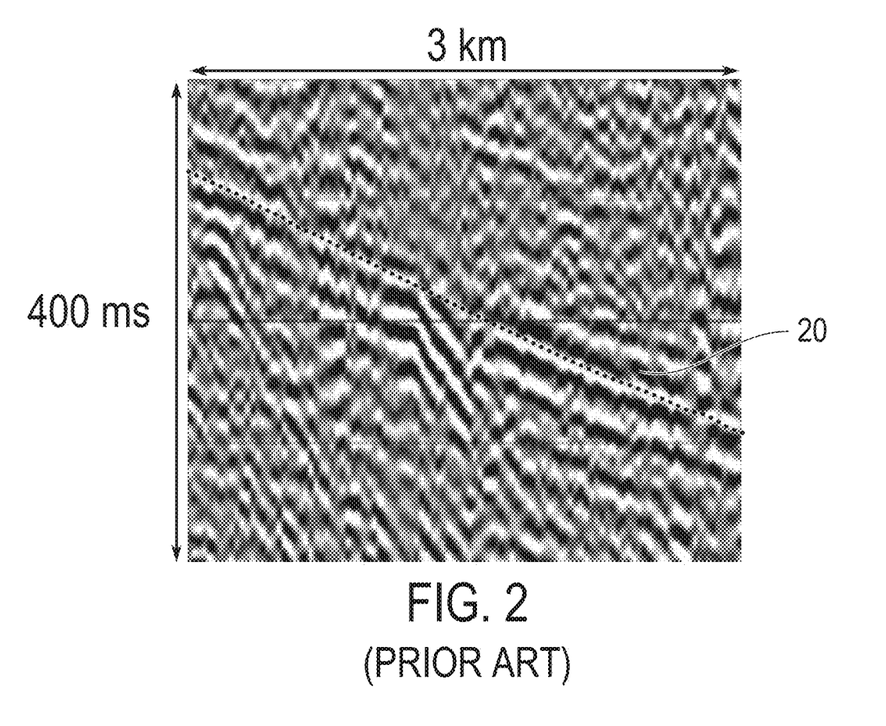
FIG. 2 is an exemplary filtered common receiver gather plot typically received using a seismic-while drilling system according to the prior art.

FIG. 1 shows a typical seismic correlated drill-bit gather plot. The dominant linear events 10, denoted by the diagonally oriented lines, represents the noise caused by the surface sources. Recovering the subsurface signal from the noise requires intensive filtering of the recorded drill-bit gather. A typical harsh 20 Hz low-cut filter is used to filter out the undesired surface noise. A filtered common receiver gather plot showing the direct arrival from the drill-bit at approximately 475 meters away from the well is shown in FIG. 2. The SWD checkshot (velocity measurement) profile is obtained by picking the P-wave first arrival on a zero-offset (i.e., near offset) common receiver gather. The dots 20 shown along the path the dark lines denote the first-break picks of the direct arrivals from the drill bit location as the drill bit penetrates through a total depth of 3 km. This typical SWD receiver gather is obtained at a relatively large offset (>400 m) away from the well due to the low SNR of the subsurface drill-bit signal compared to noise generated by the surface sources. The profiles obtained in this manner are not sufficiently robust and do not contain enough useful information to characterize near-surface hazards with a desired degree of precision and accuracy.

SUMMARY OF THE DISCLOSURE

The systems and methods disclosed provide improvements in the quality of seismic-while-drilling data, which help reconstruct more robust velocity profiles and subsurface images near and around the well, enabling safer, faster and less costly well excavation.

The present disclosure describes a system for obtaining a high SNR seismic "while-drilling" data and constructing a reliable velocity profile of a geological site, at which a main well is being drilled using a drilling device, from seismic data arising from the drilling device acting as a seismic source. The system comprises at least one uphole positioned in the vicinity of the main well that extends from a surface to a predetermined depth which exceeds 30 meters below the surface, at least one distributed acoustic fiber optic cable deployed vertically in each uphole, at least a portion of the fiber optic cable being positioned at least at the predetermined depth, and a seismic data recording station positioned on the at least one fiber optic cable positioned at the predetermined depth. The recording station on the at least one fiber optic cable is operative to record a high SNR seismic velocity profile of the seismic data arising from the drilling device at the predetermined depth, from which near-surface hazards at the geological complexities can be assessed.

In certain embodiment, the system further includes a control station for interrogating the at least one fiber optic cable using a laser beam.

One or more of the at least one uphole and at least one fiber optic cable deployed therein can extend to a depth of between 100 and 150 meters below the surface.

One or more of the at least one fiber optic cable can also include a first recording station positioned at a first depth, and a second recording station positioned at a second depth of the cable. A processor can be configured to receive and cross-correlate first seismic data arising from a drilling source at a first source depth and recorded at the first recording station and second seismic data arising from the first source location and recorded at the second recording station to generate a first cross-correlation. The processor can be further configured to receive third seismic data arising from the drilling source at a second source depth and recorded at the first recording station and fourth seismic data arising from drill source at the second location and recorded at the second. The processor is configured to cross-correlate the third and fourth seismic to generate a second cross-correlation and to stack the first and second cross-correlations to improve the signal-to-noise ratio of the seismic while-drilling data and reconstruct a more reliable velocity profile.

In the system, at least one uphole can be positioned within a 250-meters radius of the main well. In certain embodiment, the at least one uphole comprises three or more upholes, each uphole having a deployed vertical fiber optic cable.

The present disclosure also describes a method of obtaining high SNR seismic "while-drilling" data and retrieving a velocity profile of a geological site having a main well and at least one uphole located in the vicinity of the main well, the seismic profile being obtained from seismic waves generated by a drilling device located at the main well. The method comprises deploying at least one distributed acoustic fiber optic cable vertically in the at least one uphole, at least a portion of the fiber optic cable being positioned at a predetermined depth exceeding 30 meters below the surface, receiving seismic data at recording station positioned on the at least one fiber optic cable at at least the predetermined depth; and at a processor: generating a high SNR seismic while-drilling data from which a velocity profile is constructed; and determining a presence of near surface hazards from the generated high SNR seismic while-drilling data.

In certain embodiments, the method further comprises interrogating the at least one fiber optic cable using a laser beam.

In certain embodiments, the processor is configured to receive first seismic data arising from a drilling source located at a first source depth and recorded at a first recording depth, and second seismic data arising from the drilling source at the first source depth and recorded at the second recording depth and to cross-correlate the first and second seismic data, generating a first cross-correlation. In certain embodiments the processor is further configured to receive third seismic data arising from the drilling source at a second source depth location and recorded at the first recording depth, and fourth seismic data arising from drill source at the second location and recorded at the second recording depth, to cross-correlate the third and fourth seismic data and the fourth seismic data to generate a second cross-correlation, and to stack the first and second cross-correlations to improve the SNR of the seismic while-drilling data.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

The present disclosure describes a system and method for obtaining high SNR drill bit seismic data over a geological site and thereby assess drilling hazards in near-surface geology. The system employs a distributed acoustic sensing (DAS) configuration of fiber-optic cables as sensing elements to record seismic waves generated by the drilling bit. These recorded waves are known as "while-drilling" signals (data). The fiber-optic cables are installed in multiple upholes in the vicinity of a proposed well location and extend downwardly through the upholes to depths that exceed typical near-surface formations. The cables include active dense receiver stations that continuously record seismic-while-drilling signals as a drill-bit penetrates through subsurface formations. The disclosed system increases the signal-to-noise ratio of seismic data by recording signals at depths that are not affected by near-surface complexities which ordinarily cause the scattering of seismic waves. A seismic interferometric transformation is applied to the recorded data by the fiber-optic cable to further enhance the signal-to-noise ratio of the signal by retrieving a reverse single-well seismic profile (rSWP). The transformation provides a reliable velocity model from the surface to total depth in the main well cable, and provide accurate near surface velocities from the upholes cables.

Figure 3:
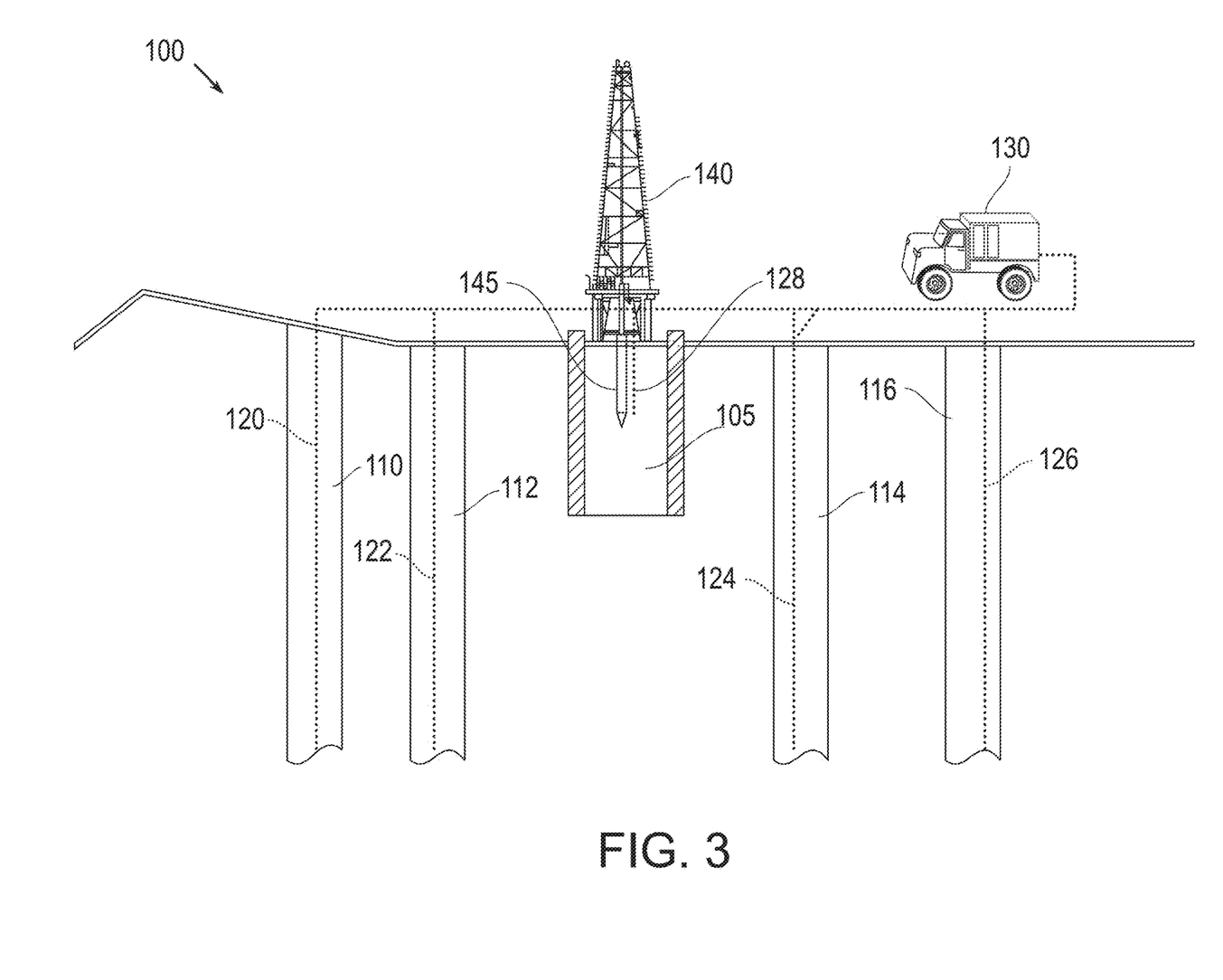
FIG. 3 is schematic diagram of an embodiment of a system for obtaining a high SNR seismic velocity profile at a geological site by recording seismic data using distributed acoustic sensing while drilling according to the present disclosure.
Figure 7:
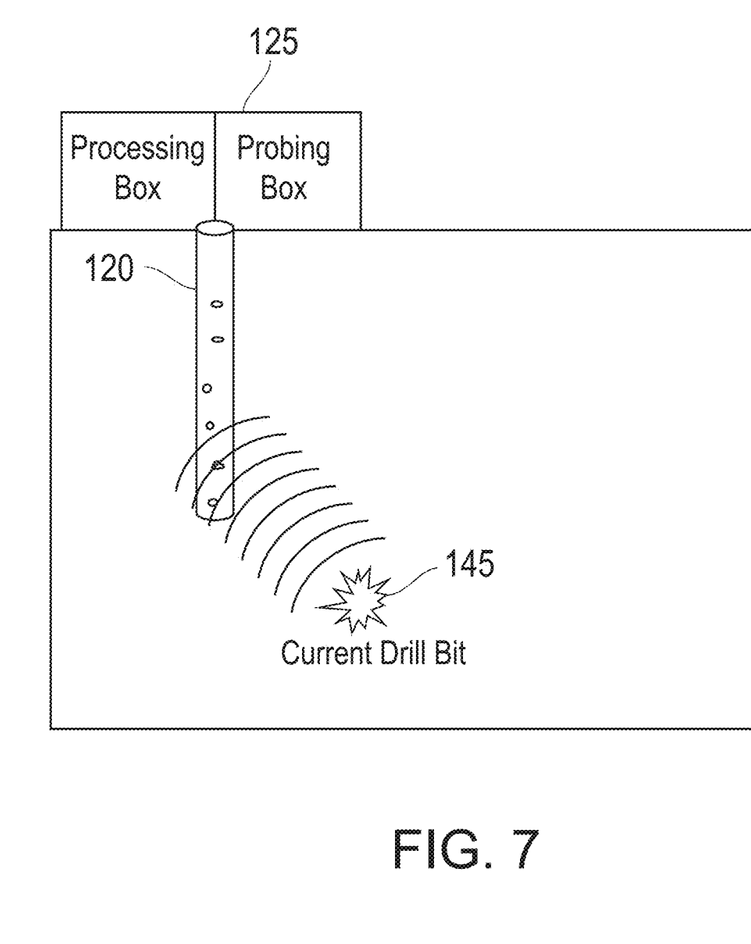
FIG. 7 is a schematic illustration of a distributed acoustic system (DAS) recording system that can be used in the context of the embodiments described in the present disclosure.

FIG. 3 is schematic diagram of an embodiment of a system for determining hazards at a geological site by recording seismic data while drilling. The system 100 comprises a distributed acoustic sensing (DAS) configuration to assess drilling hazards in the near-surface geology around a proposed well 105 such as cavities karsts, and faults. In the system 100, a plurality of upholes 110, 112, 114, 116 are drilled in the vicinity around the proposed well 105. The phrase "in the vicinity" is defined here as being within a 250-meter radius. The number of the upholes can be varied according to the terrain and other factors. The upholes are equipped with respective fiber-optic cables 120, 122, 124, 126 that extend vertically downward through the upholes from the surface to a depth that lies beneath typical near surface formations, for example, between 30 meters and 150 meters below the surface (for ease of illustration, the cables are shown by themselves without the upholes in which they are installed). The deeper sections of the cables 120-126, e.g., below 30 meters, are positioned beneath complex near-surface geology that can scatter the received seismic wavefield and therefore the signal-to-noise ratio of received seismic data is dramatically improved. Additionally, the buried cables 120-126 are far from any noisy surface sources in the rig site. The fiber-optic cable act as a sensing tool that can capture densely the passage of seismic wavefields travelling along the fiber. FIG. 7 is a schematic illustration of a DAS recording system, recording the wavefield ignited by the drill bit 145. The fiber-optic cable 120, which has small variations in refractive index, is connected to a probing/processing box 125. The probing box emits a laser pulse down the fiber and the light is backscattered due to the variation in refractive index. In the case of the passage of the seismic waves at later instants, a subsequent laser pulse sent down undergoes Rayleigh backscattering and bounces off the stretched part. Using the travel time and amplitude of the returning backscattered light to the box, we can find where the signal is coming from and how strong it is. The interrogation box is able to convert the optical signal into a useful strain signal (i.e., seismic signal) that samples the seismic wavefield quite densely, say at 1-meter intervals. Tens or hundreds of recording stations (not shown in FIG. 3) can be embedded in each of the cables at various depths to record while-drilling seismic signals, depending on the total depth of the upholes. This enables interferometric stacking procedures which are described further below. The quality and sampling of the recording wavefields at each station depend on the quality of the interrogation box and the gauge length (GL), which is the length along the fiber the signal is averaged over. The longer the GL, the higher the SNR of the output seismic signal from the optical signal. However, the resolution is sacrificed as the signal now is averaged over a longer portion of the cable length. Therefore, a proposed implementation is to acquire the recorded data using multiple GL's simultaneously. As a result, the while-drilling seismic data recorded with the small gauge length, say 1 meter, will be most useful for the shallowest stations 0-50 meters. On the other hand, the larger GL, say 2-4 m, could be most useful for depth below 50 m.

Figure 8A:
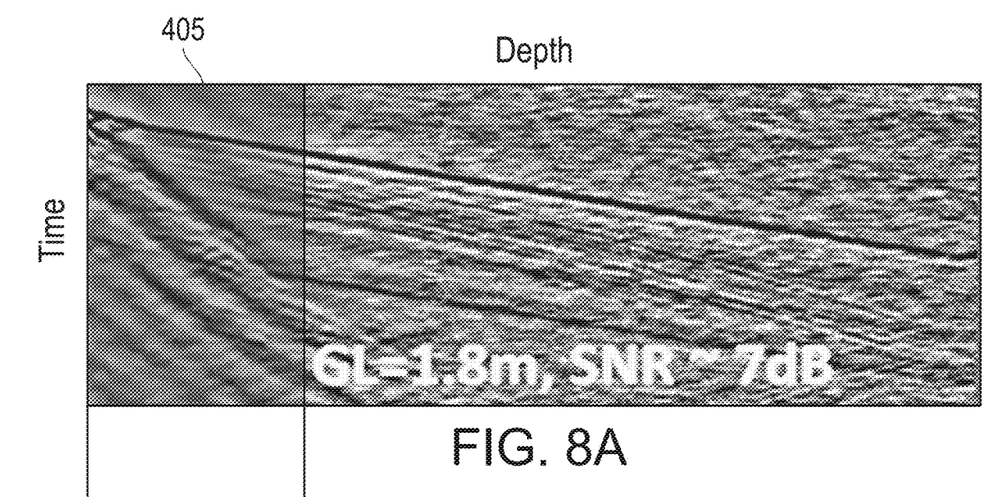
FIGS. 8A and 8B are common gather plots obtained using different fiber cable gauge lengths (GLs) and illustrate the effect of gauge length on SNR.
Figure 8B:
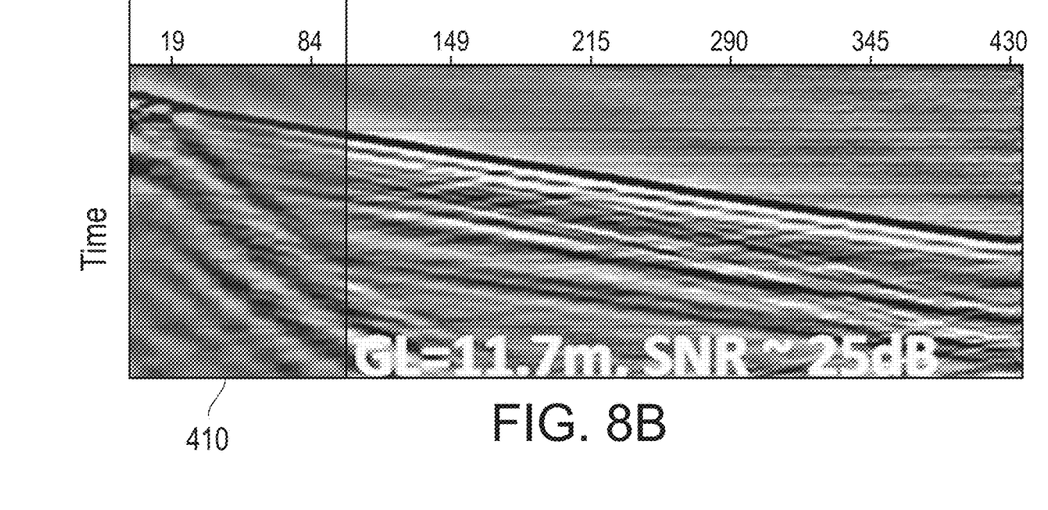

FIGS. 8A and 8B are common source gather plots that illustrate the effect of the gauge length (GL) on the quality of shallow uphole DAS data acquired with a controlled source. The data obtained at the relatively shallow depth (125 m below the surface) highlighted in each figure is highlighted with a red rectangle. Comparing FIG. 8A and FIG. 8B, the rectangular area 405 in FIG. 8A exhibits higher data quality (higher SNR) for the smaller gauge length with less smearing effect than the corresponding area 410 in FIG. 8B. In contrast, the data quality is better for the deeper non-highlighted section in FIG. 8B taken using the longer gauge length, as the noise is more amplified using the smaller gauge length in this case as shown in the non-highlighted area of FIG. 8A. To take advantage of these variances, a multi gauge-length system is used to be able to capture the highest data quality from the drill-bit.

In the depicted embodiment, the fiber cables 120-126 are coupled to a control station 130. The control station is equipped to interrogate the fiber optic cables by transmitting a laser beam through the fibers and serves as a receiving station for reflected optical signals that travel backward through the fiber-optic cables. The reflectance of the fiber optic cables is modified by the impact of seismic waves, which impacts the receipt of the reflected laser beam at the control station. A drill rig 140 including drill-bit 145 is shown positioned about the main well 105. As the drill-bit 145 penetrates through rock material in the main well it generates seismic waves that are sensed by the fiber-optical cables 120-126. The drill rig can include an additional fiber-optic cable 128 to record seismic while drilling data.

Figure 4A:
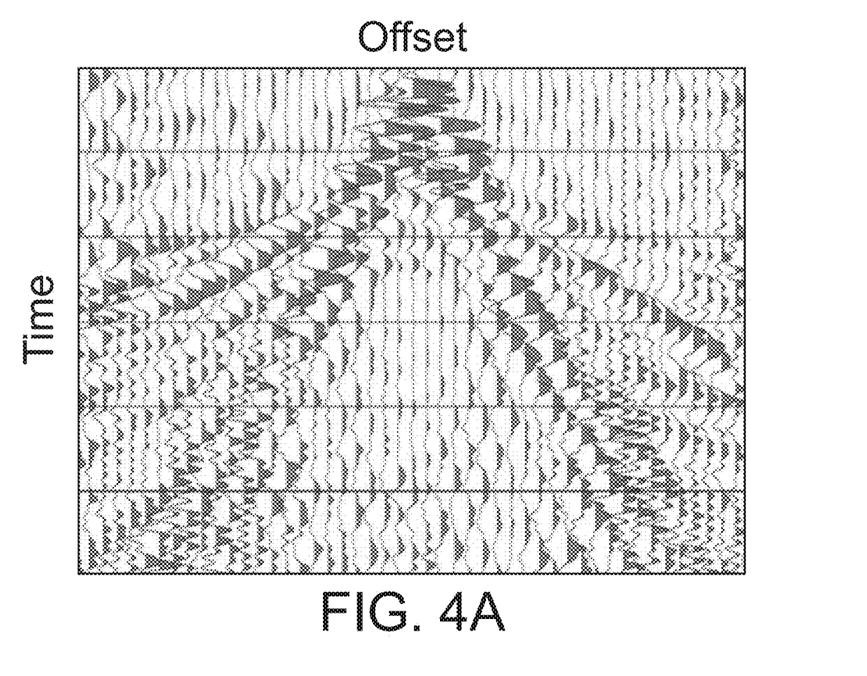
FIG. 4A is a plot of seismic signals received at the shallow stations obtained using an embodiment of the system of the present disclosure.
Figure 4B:
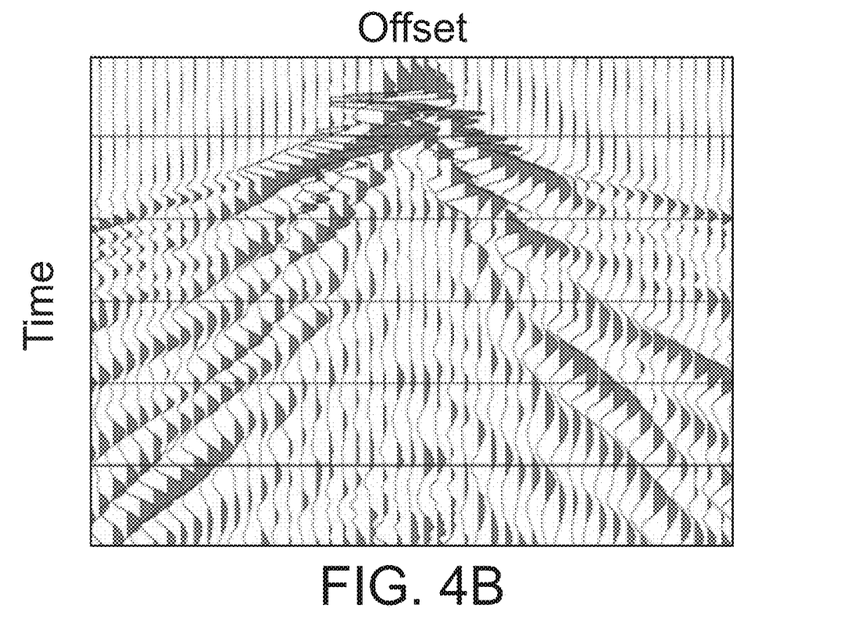
FIG. 4B is a common receiver gather plot from the deeper receiving stations at 40 meters below the surface obtained using an embodiment of the system of the present disclosure.

In an experimental set-up, vertically-buried DAS fiber-optic cables were tested using multiple controlled sources that delivered 560 controlled shots along the earth surface. The seismic signals were received by recording station of the fiber-optic cables at both shallow depths (<5 meters below the surface) and at 40-meter depth. FIG. 4A is a common receiver gather (CRG) plot of seismic signals received at the shallow stations. Due to the high scattering of the wavefield in the complex near-surface, the signal-to-noise ratio (SNR) is less than 15 dB in this plot. FIG. 4B is a common receiver gather plot from the deeper receiving stations at 40 meters below the surface. This plot shows a higher SNR of about 30 dB at 40 m depth, demonstrating the enhancement of SNR at recording stations buried deeper below near-surface features.

While the improvements to the SNR due to receiving and recording seismic signals at depth are notable, additional techniques can be used to enhance the SNR of the seismic signals obtained by the system according to the present disclosure. In particular, the present disclose provides a seismic interferometry technique for transforming seismic data from one acquisition geometry to another by cross-correlation and/or convolution of recorded seismic traces. The interferometric transformation further enhances the SNR by reducing the effects of any noise sources or scattering near surface-geology. The transformation technique is described with reference to the illustrations of FIGS. 5A and 5B. The control station 130 (shown in FIG. 3) can include a processor (computing device) that is configured to perform the transformations base on seismic data recorded by the DAS fiber optic cables. Equally, the seismic data can be communicated locally or remotely to another computing device that is configured to perform the operations. As those of skill in the art would recognize, the seismic data recorded by the system 100 can be saved and uploaded to a central database to enable remote access for analysis.

Figure 5A:
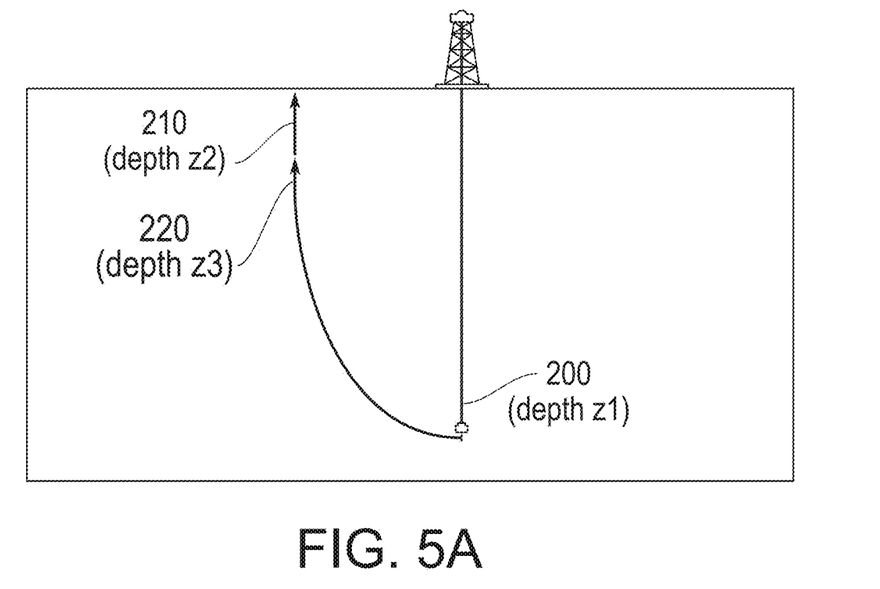
FIG. 5A is a schematic diagram depicting a drill bit source at a first depth level and recordings stations on a fiber optic cable positioned at different depths.

FIG. 5A is a schematic diagram depicting a drill bit source 200 at depth level z1 and a recording station 210 on a fiber optic cable positioned at a shallow depth z2 and a second recording station 220 positioned at a deeper position z3 on the fiber optic cable. According to the interferometric method, the processor of the control station is configured to cross-correlate recordings of the seismic signals generated by the source s1 at each of the recording stations A, B. More specifically, the seismic recording, at station 210, of the trace fired at s1 is termed G(s1|A), while the seismic recording, at station 220, of the trace fired at s1 is termed G(s1|B). The cross-correlation of the two recorded traces yields a new seismic response, G(B|A). G(B|A) can be considered as a seismic trace fired at a virtual source at station 220 and recorded at the DAS station 210. It should be understood that while two recording stations are shown positioned at different depths on a single fiber optic cable. Two or more recording stations can be similarly placed on any number of the fiber optic cables of the DAS system. Additionally, one or more the fiber optics can include more than two recording stations at different depths along their respective lengths.

Figure 5B:
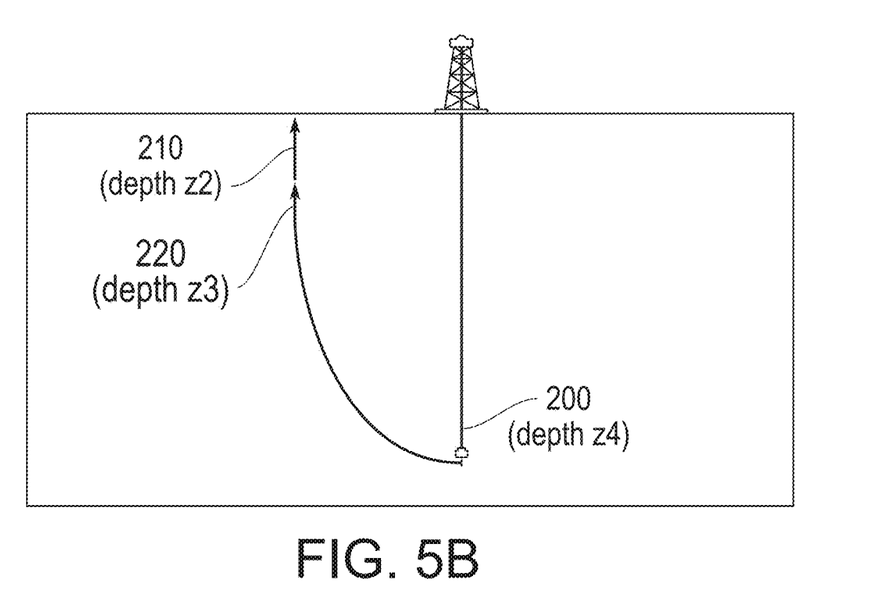
FIG. 5B is a schematic diagram a drill bit source at a second depth level and recordings stations on a fiber optic cable positioned at different depths as in FIG. 5A.

FIG. 5B is similar to FIG. 5A except that the drill bit source 200 is positioned at a lower depth z4, and accordingly the seismic traces emerge from a different location. Each of the stations 210, 220 record corresponding signals G(s2|A), G(s2|A) for the new source location. Cross-correlations can be obtained for these responses as well. The processor can compute a composite virtual trace from both correlations, which can be expressed as:

$$G(B|A)=\Sigma_s G(A,s)G(B|s)^*, \quad (1)$$

This summing is referred to as "stacking". The stacking of correlated traces enhances the signal-to-noise ratio by a factor of $\sqrt{s}$, in which s is the number of drill bit source locations from which seismic waves are recorded. Reverse checkshots can be obtained with virtual sources (receiver stations) at locations near to the surface (as shown in FIGS. 5A and 5B) or using deeper virtual sources (i.e., receiver stations along the fiber) positioned at greater depths of the vertical cable, which can be placed in the main drilled rig.

Figure 6:
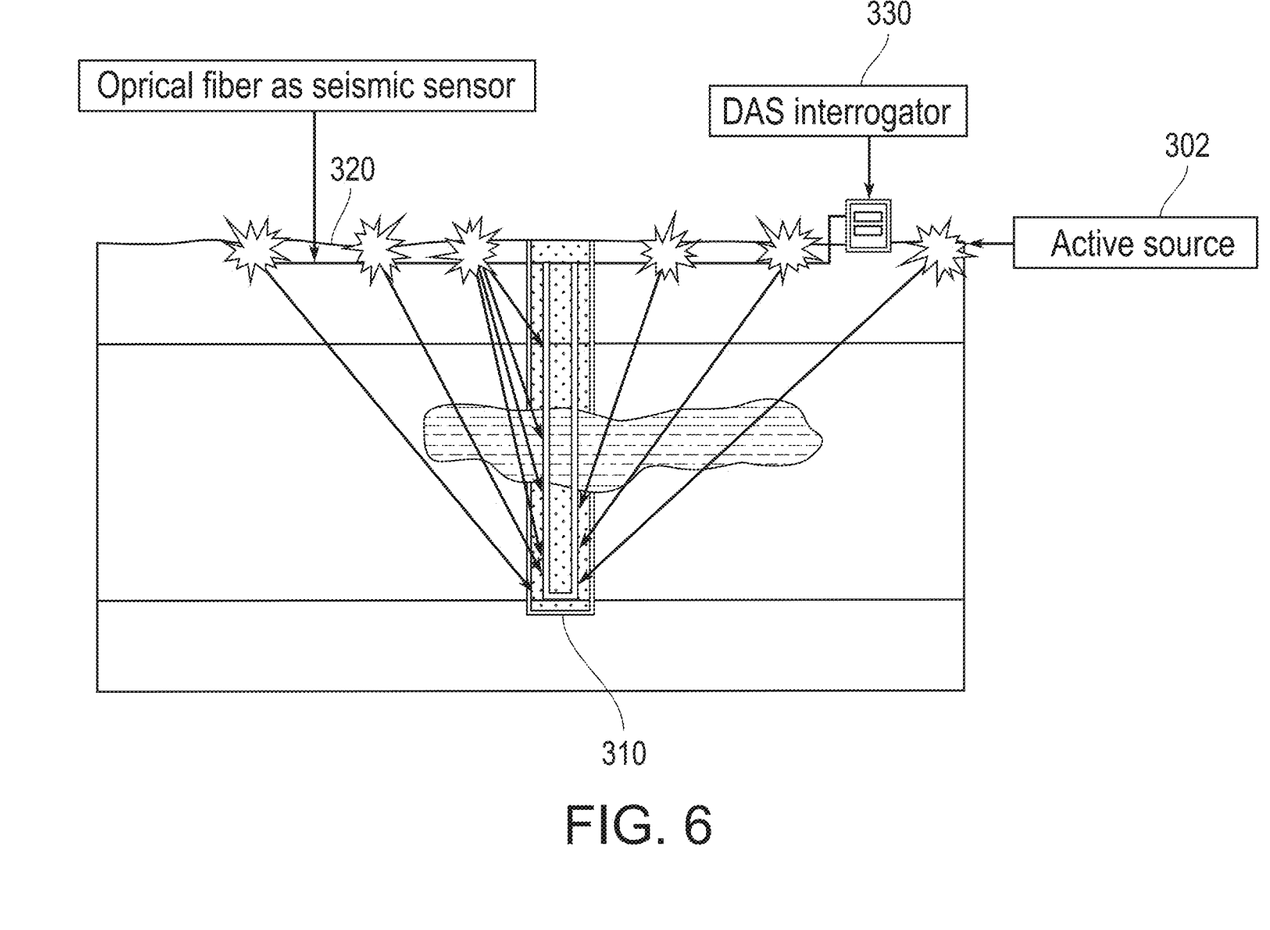
FIG. 6 is schematic diagram of an alternative embodiment of a system for determining hazards at a geological site by recording seismic data using distributed acoustic sensing while drilling using an active source according to the present disclosure.

For rigs that are already functioning and lack upholes in the vicinity in which to place fiber optical cables, it is still possible to obtain improved near-surface velocity profiles using another embodiment of a system according to the present disclosure. This embodiment is schematically depicted in FIG. 6. One or more satellite upholes e.g., 310 is positioned outside the "vicinity" as defined above, but still within a range of distance of a drill rig or other active source 305. The satellite uphole 310 is equipped with a fiber optic sensor 320 that extends horizontally along a near-surface trench, then vertically into and out of the satellite uphole and then horizontally along the trench on the opposite side of the uphole. The fiber optic array 320 is coupled to a DAS interrogation station 330. With this configuration, a pre-drill hazard assessment can be carried out by receipt of seismic signals from the active source by the fiber optic sensor at depth (e.g., 30 meters or deeper) within the uphole 310. Additionally, satellite upholes such as shown in FIG. 6 can also be deployed in a quieter regime in terms of drilling noise to collect SWD signal with higher SNR.

Figure 9:
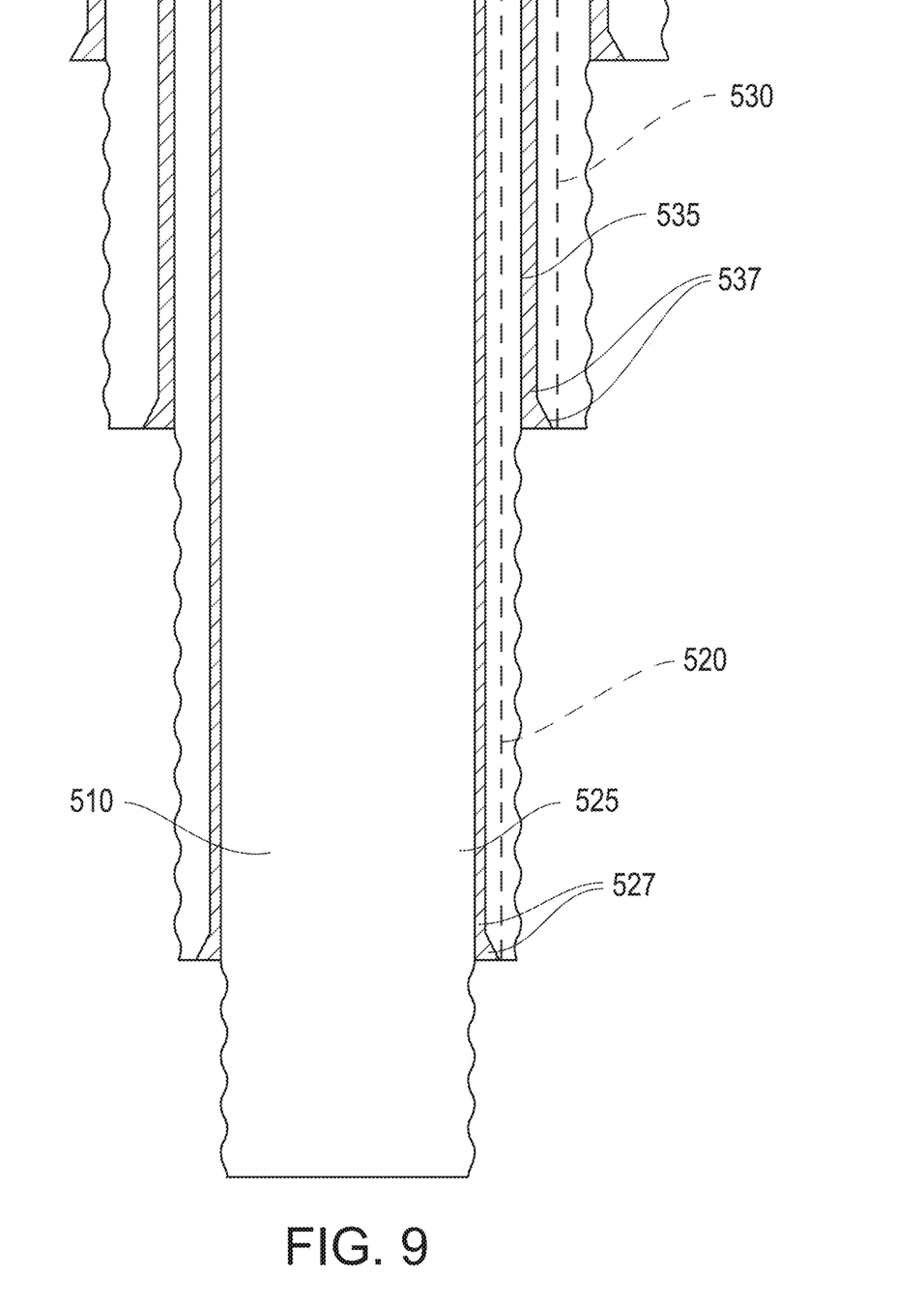
FIG. 9 is a cross-sectional view of a main drill rig in which fiber optic cables are included according to an alternative embodiment of the present disclosure.

As a limiting case, fiber-optic cables are installed in the main drilled rig. The cables can be longer than those used in the satellite upholes and can extend from the surface to the desired casing shoe as shown in FIG. 9. A first fiber cable 520 (denoted by dashed line) is installed behind casing 525 surrounding main borehole 510, extending to casing shoed 527. A second fiber cable 530 is installed behind casing 535 and extends to casing shoe 537. As the installation positions of the fiber are known, the interferometric transformation can ensure the retrieval of a deeper reverse checkshot profile in the main drilled rig.

The system for seismic hazard assessment while drilling described herein has the advantage that seismic-while-drilling (SWD) data can be recorded and has a higher signal-to-noise ratio than conventional systems for recording SWD data. The system also enables the recording of near-offset traces to the rig, which are typically contaminated with extreme scattering and rig noise. The use of vertical arrays of fiber-optic cable arranged in upholes with near-offsets allows seismic data to be obtained that bypasses the noise of surface activity and near-surface geological complexities. The interferometric stacking method described herein further boosts the signal-to-noise ratio to levels that enable accurate and precise velocity profiles to be obtained.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for obtaining a high SNR seismic while-drilling data received in response to a drilling device acting as a seismic source and using the high SNR seismic while-drilling data to construct a reliable velocity profile of a geological site, at which a main well is being drilled using the drilling device, the system comprising:
   at least one additional well hole positioned in the vicinity of the main well that extends from a surface to a predetermined depth which exceeds 30 meters below the surface;
   at least one distributed acoustic fiber optic cable deployed vertically in each well hole, at least a portion of the fiber optic cable being positioned at least at the predetermined depth;
   a seismic data recording station positioned on the at least one fiber optic cable positioned at the predetermined depth;
   wherein one or more of the at least one fiber optic cable includes a first recording station positioned at a first depth, and a second recording station positioned at a second depth of the cable; and
   a processor configured to:
   receive first seismic data sensed in response to the drilling device positioned at a first source depth and recorded at the first recording station, and second seismic data sensed in response to the drilling device at the first source depth and recorded at the second recording station; and
   cross-correlate the first seismic data with the second seismic data to generate a first cross-correlation;
   wherein the recording station on the at least one fiber optic cable is operative to record a high SNR seismic velocity profile obtained from analysis of the seismic data obtained using the at least one fiber optic cable from which near-surface hazards at the geological complexities can be assessed.

2. The system of claim 1, further comprising a control station for interrogating the at least one fiber optic cable using a laser beam.

3. The system of claim 1, wherein one or more of the at least one additional well hole and at least one fiber optic cable deployed therein extend to a depth of between 100 and 150 meters below the surface.

4. The system of claim 1, wherein the processor is further configured to:
receive third seismic data sensed in response to the drilling device positioned at a second source depth and recorded at the first recording station, and fourth seismic data sensed in response to the drilling device positioned at the second source depth and recorded at the second recording station; and
cross-correlate the third seismic data and the fourth seismic data to generate a second cross-correlation;
stack the first cross-correlation and the second cross-correlation to improve an SNR of the seismic while-drilling data and reconstruct a more reliable velocity profile.

5. The system of claim 1, wherein the at least one additional well hole is positioned within a 250-meter radius of the main well.

6. The system of claim 1, wherein the at least one additional well hole comprises three or more additional well holes, each additional well hole having a deployed vertical fiber optic cable.

7. A method of obtaining high SNR seismic while-drilling data and retrieving a velocity profile of a geological site having a main well and at least one additional well hole located in the vicinity of the main well, the seismic profile being obtained from seismic waves generated by a drilling device located at the main well, the method comprising:
deploying at least one distributed acoustic fiber optic cable vertically in the at least one additional well hole, at least a portion of the fiber optic cable being positioned at a predetermined depth exceeding 30 meters below the surface;
receiving seismic data at a recording station positioned on the at least one fiber optic cable at at least the predetermined depth;
recording seismic data at first and second recording depths on the fiber optic cable; and
at a processor:
generating a high SNR seismic while-drilling data from which a velocity profile is constructed;
determining a presence of near surface hazards from the generated high SNR seismic while-drilling data;
receiving first seismic data sensed in response to the drilling device positioned at a first source depth and recorded at a first recording depth, and second seismic data sensed in response to the drilling device at the first source depth and recorded at the second recording depth; and
cross-correlating the first and second seismic data, generating a first cross-correlation.

8. The method of claim 7, further comprising interrogating the at least one fiber optic cable using a laser beam.

9. The method of claim 7, wherein the at least one fiber optic cable is deployed to a depth of between 100 and 150 meters below the surface.

10. The method of claim 7, further comprising:
by the processor:
receiving third seismic data sensed in response to the drilling device at a second source depth and recorded at the first recording depth, and fourth seismic data sensed in response to the drilling device at the second source depth and recorded at the second recording depth; and
cross-correlating the third and fourth seismic data to generate a second cross-correlation;
stacking the first and second cross-correlations to improve the SNR of the seismic while-drilling data.

11. The method of claim 1, wherein the at least one additional well hole is positioned within a 250-meter radius of the main well.

12. A system for obtaining a high SNR seismic while-drilling data received in response to a drilling device acting as a seismic source at a geological site at which a main well is being formed using the drilling device, the system comprising:
at least one additional well hole positioned in the vicinity of the main well that extends from a surface to a predetermined depth which exceeds 30 meters below the surface;
at least one distributed acoustic fiber optic cable deployed vertically in each additional well hole, at least a portion of the fiber optic cable being positioned at least at the predetermined depth;
first and second seismic data recording stations positioned on the at least one fiber optic cable; and
a processor configured to:
receive first seismic data sensed in response to drilling device activity at a first source depth and recorded at a first recording station;
receive second seismic data sensed in response to drilling device activity at the first source depth and recorded at a second recording station; and
cross-correlate the first seismic data with the second seismic data to generate a first cross-correlation; and
generate a high SNR seismic velocity profile obtained from analysis of the first and second seismic data and the first cross-correlation, from which near-surface hazards at the geological complexities can be assessed.

* * * * *